US010308184B2

(12) United States Patent
Hasegawa et al.

(10) Patent No.: US 10,308,184 B2
(45) Date of Patent: Jun. 4, 2019

(54) DOOR MIRROR CONTROL DEVICE

(71) Applicant: KABUSHIKI KAISHA TOKAI-RIKA-DENKI-SEISAKUSHO, Aichi (JP)

(72) Inventors: Tetsuyuki Hasegawa, Aichi (JP); Shinichi Miyazaki, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 15/577,889

(22) PCT Filed: May 31, 2016

(86) PCT No.: PCT/JP2016/066036
§ 371 (c)(1),
(2) Date: Nov. 29, 2017

(87) PCT Pub. No.: WO2016/194903
PCT Pub. Date: Dec. 8, 2016

(65) Prior Publication Data

US 2018/0162278 A1 Jun. 14, 2018

(30) Foreign Application Priority Data

Jun. 2, 2015 (JP) .................. 2015-112286

(51) Int. Cl.
*B60R 1/074* (2006.01)
*H02P 5/68* (2006.01)
(52) U.S. Cl.
CPC ............... *B60R 1/074* (2013.01); *H02P 5/68* (2013.01)
(58) Field of Classification Search
CPC ................... B60R 1/074; H02P 5/68
See application file for complete search history.

(56) References Cited

U.S. PATENT DOCUMENTS

2008/0055758 A1\* 3/2008 Sho .................. B60R 1/074
359/877
2014/0160586 A1 6/2014 Choi

FOREIGN PATENT DOCUMENTS

| JP | S63-109238 U | 7/1988 |
| JP | 2001-328487 A | 11/2001 |
| JP | 2006-166678 A | 6/2006 |

OTHER PUBLICATIONS

International Search Report and Written Opinion issued in the corresponding application PCT/JP2016/066036 dated Aug. 23, 2016.

(Continued)

*Primary Examiner* — Jennifer D. Carruth
(74) *Attorney, Agent, or Firm* — Roberts Mlotkowski Safran Cole & Calderon, P.C.

(57) ABSTRACT

A door mirror control device supplies drive voltages to respective lock detection sections in left and right door mirrors. If motors are driven in accordance with the drive voltages, the door mirrors are operated from one of a retracted position or a deployed position toward the other of the retracted position or the deployed position, and the motors stop after the door mirrors reach either the retracted position or the deployed position. Operating time determination sections determine operating times of the door mirrors from changes in values of operating currents. Voltage setting sections change settings for the drive voltages supplied to lock detection circuits of the door mirrors based on the operating times of the left and right door mirrors such that the operating times of the left and right door mirrors match each other.

6 Claims, 10 Drawing Sheets

(56) References Cited

OTHER PUBLICATIONS

Extended European Search Report issued in the corresponding application EP 16803337.1 dated Nov. 20, 2018.

* cited by examiner

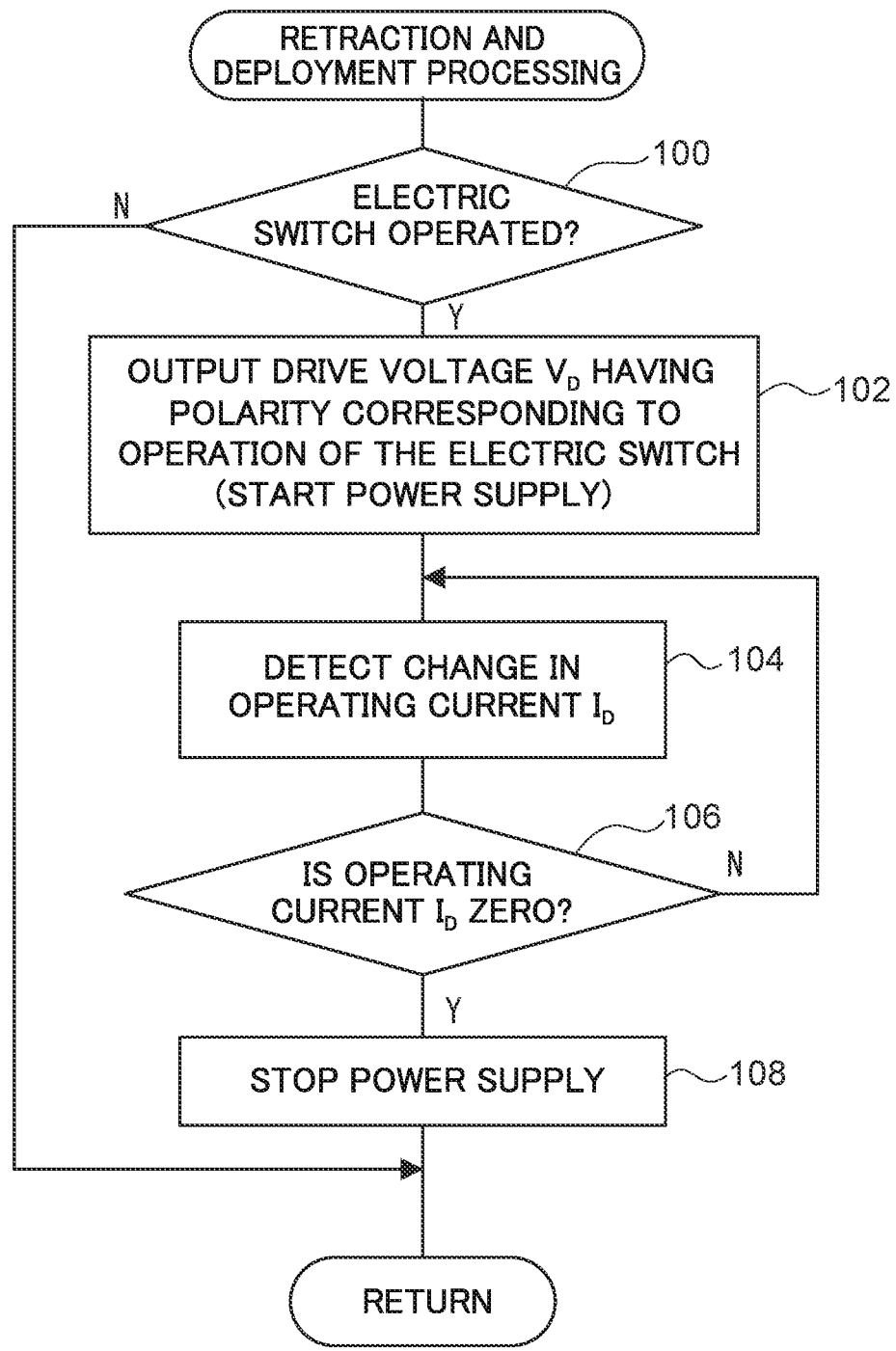

DOOR MIRROR CONTROL DEVICE

CROSS-REFERENCE TO RELATED APPLICATIONS

The present application is a U.S. National Phase of PCT/JP2016/066036 filed on May 31, 2016 claiming priority to Japanese Patent Application No. 2015-112286 filed Jun. 2, 2015. The disclosure of the PCT Application is hereby incorporated by reference into the present Application.

TECHNICAL FIELD

The present disclosure relates to a door mirror control device provided at a vehicle.

BACKGROUND ART

Rear-view mirrors that are attached to the vehicle and employed to check the area behind the vehicle include door mirrors provided at the front doors on each side of the front seats of a vehicle. As such door mirrors, electronically retractable mirrors are widely used. Electronically retractable mirrors are provided with a motor and pivot between a retracted position and a deployed position, this being the position of normal use, as the motor is driven in accordance with the operation of a switch.

The angle between the retracted position and the deployed position is different for the driver-side door mirror and the passenger-side door mirror of vehicles, with the angle on the front-passenger side being smaller than the angle than that on the driver side. Left and right electronically retractable door mirrors operate in parallel to respectively move to their retracted position or their deployed position. However, if the angle between the deployed position and the retracted position differs on the left and right, there is an offset in the timings at which the retracted positions or the deployed positions are reached.

When there is an offset in the timings at which the left and right door mirrors of a vehicle reach their retracted positions or their deployed positions, this does not always impart an appealing impression. In particular, in vehicles known as luxury cars, the ignition switch is turned OFF (for example, to ACC OFF) to move the door mirrors to their retracted positions, and the ignition switch is turned ON (for example, to ACC ON) to move the door mirrors to their deployed positions. Further, in vehicles with a keyless entry system, for example, in which locking and unlocking of the doors is performed using a wireless key (portable device) such as a smart key, control may be coordinated such that locking the doors moves the door mirrors to the retracted positions and unlocking the doors moves the door mirrors to their deployed positions. An offset in the timings at which the left and right door mirrors reach their retracted positions or their deployed positions is detrimental to the sense of luxury of such vehicles.

Japanese Utility Model Application Laid-Open (JP-U) No. S63-109238 proposes providing the drive circuit of a left-side door mirror with a speed control circuit, and lowering a voltage supplied to the motor of the left-side door mirror so as to be lower than a voltage supplied to the motor on the right-side. In JP-U No. S63-109238, the timings at which the left and right door mirrors reach their retracted positions or their deployed positions are thus matched so as to impart a sense of luxury to the vehicle.

Japanese Patent Application Laid-Open (JP-A) No. 2006-166678 proposes providing a step at which a control value for a voltage or a current is lower than during steady operation, extracting a motor rotation signal with high precision at this step, and controlling a rotation speed and drive amount of the motor based on the extracted rotation signal. JP-A No. 2006-166678 also proposes learning drive amounts for the motor. JP-A No. 2006-166678 is thus able to control, with high precision, the position of a door mirror operated by driving the motor.

Note that when the retracted position or the deployed position is reached, for example, the motor in each electronically retractable door mirror adopts a locked state, and a control device provided at the vehicle stops power to the motor when the motor has adopted a locked state. Some door mirrors are also provided with a lock detection means to detect the locked state of the motor and stops power to the motor. In a door mirror provided with a lock detection means, a control device supplies the door mirror with a voltage of a polarity that corresponds with an operation of a retraction/deployment switch, detects that the power to the motor of the door mirror has been stopped, and stops the supply of voltage to the door mirror.

However, in cases in which the left and right door mirrors are provided with lock detection means to detect the locked state of the motors and stop power to the motors, it is difficult for the control device to accurately ascertain the timings at which the door mirrors reach their retracted positions or their deployed positions. Thus, if there is an offset in the timings at which the retracted positions or the deployed positions are reached when the left and right door mirrors are retracted or deployed, this offset is difficult to eliminate, leading to a state detrimental to the sense of luxury of the vehicle.

SUMMARY OF INVENTION

Technical Problem

The present disclosure provides a door mirror control device that prevents a retraction or a deployment operation of door mirrors, which each include a lock detection means to detect a locked state of a motor and to stop power to the motor, from having a detrimental effect on the sense of luxury of a vehicle.

Solution to Problem

A first aspect of the present disclosure is a door mirror control device including voltage setting sections, detection sections, and a changing section. The voltage supply sections are provided so as to each correspond to one of a pair of door mirrors that are provided at the left and right of a vehicle. The door mirrors each include (i) a motor that is driven by the supply of a voltage and that operates the respective door mirror from one of a retracted position or a deployed position to the other of the retracted position or the deployed position at a speed corresponding to the magnitude of the voltage, and (ii) a lock detection section that supplies to the motor, as the voltage, a voltage of a magnitude corresponding to a drive voltage supplied to the lock detection section and that stops supplying the voltage to the motor in a case in which the respective door mirror has reached the retracted position or the deployed position and the motor has adopted a locked state. Each voltage supply section supplies the drive voltage to the respective lock detection section with a magnitude set for the respective door mirror. The detection sections are provided so as to each correspond to one of the pair of door mirrors, and, from change in a current flowing through the respective lock detection section, detect an operating time to operate the respective door mirror from one of the retracted position or the deployed position to the other of the retracted position or the deployed position. The changing section, based on the respective operating times of the door mirrors detected by the detection sections, changes a magnitude setting of the drive voltage supplied by the voltage supply section to the lock detection section of at least one of the pair of door mirrors such that operating times for the pair of door mirrors to operate from one of the retracted position or the deployed position to the other of the retracted position or the deployed position match each other.

In the present disclosure having the above configuration, the motors are driven by the voltage supply sections supplying the drive voltages to the lock detection sections of the door mirrors, such that the door mirrors operate and move from one of the retracted position of the deployed position to the other of the retracted position or the deployed position. Each of the motors adopts a locked state when the respective door mirror reaches the retracted position or the deployed position, and each lock of the detection sections stops voltage supply to the respective motor when the motor adopts the locked state. Each of the voltage supply sections stops the supply of the drive voltage when it is detected that voltage supply to the respective motor has stopped.

Current corresponding to the operation of the respective motor flows between the voltage supply sections and the lock detection section of the respective door mirror in the interval between starting the supply of the respective drive voltage until the respective motor stops. The value of each of these currents reaches a peak value when the respective motor adopts the locked state, and each peak value is maintained by the respective lock detection section until voltage supply to the respective motor stops.

Each detection section detects current change between the respective voltage supply section and the lock detection section of the respective door mirror, and based on the detected current change, detects the interval of time from when the supply of the respective drive voltage starts up until the respective current value reaches its peak value as an operating time of the respective door mirror. This enables the operating times of the door mirrors to be accurately obtained even when the door mirrors are provided with the lock detection means.

Based on the detected operating times of the left and right door mirrors, the changing section sets a drive voltage such that the operating times of the left and right door mirrors match each other, and changes a magnitude setting of the drive voltages output to the door mirrors by the voltage supply sections. This enables the timings at which the left and right door mirrors reach the retracted position or the deployed position to be easily matched.

A second aspect of the present disclosure is the door mirror control device of the first aspect, wherein the changing section changes the magnitude setting of the drive voltage based on the operating times respectively detected for the pair of door mirrors in cases in which a difference in the detected operating times has exceeded a predetermined threshold value.

In the second aspect, changing the magnitude setting of the drive voltage when the difference between the detected operating time of the right door mirror and the detected operating time of the left door mirror exceeds a predetermined threshold value enables unnecessary change to the drive voltages to be suppressed.

A third aspect of the present disclosure is the door mirror control device of the first aspect or the second aspect, wherein with reference to whichever door mirror of the pair of door mirrors has a greater amount of movement from one of the retracted position or the deployed position to the other of the retracted position or the deployed position, the changing section changes the magnitude setting of the drive voltage such that a detected operating time of the other door mirror having the lesser amount of movement matches a detected operating time of the reference door mirror.

In the third aspect, the magnitude setting of the drive voltage of the door mirror having the lesser amount of movement from one of the retracted position or the deployed position to the other of the retracted position or the deployed position is changed with reference to the door mirror having the greatest amount of movement therebetween.

A fourth aspect of the present disclosure is the door mirror control device of the first aspect or the second aspect, wherein with reference to the longer operating time of the operating times respectively detected for the pair of door mirrors, the changing section changes the magnitude setting of the drive voltage supplied to the lock detection section of the other door mirror corresponding to the shorter operating time.

In the fourth aspect, the magnitude setting of the drive voltage is changed such that the shorter operating time matches a longer operating time. This enables a situation in which the drive voltage increases and the door mirrors move abruptly from one of the retracted position or the deployed position to the other of the retracted position or the deployed position to be suppressed from occurring.

A fifth aspect of the present disclosure is the door mirror control device of any one of the first aspect to the fourth aspect, wherein a permissible range is set in advance for the operating times of the pair of door mirrors to operate from one of the retracted position or the deployed position to the other of the retracted position or the deployed position. Further, in cases in which the operating times respectively detected for the pair of door mirrors are within the permissible range, the detection sections determine that the detected operating times are to be applied to change the magnitude setting of the respective drive voltage.

Door mirrors provided at vehicles are typically foldable mirrors that fold toward the vehicle front or the vehicle rear upon receiving an external force. In cases in which a door mirror is moved toward the retracted position in a state folded toward the vehicle front or the vehicle rear, the operating time will be either longer or shorter than cases in which the door mirror is moved from the deployed position to the retracted position. In cases in which such an operating time was used, an offset would arise in the timings at which the door mirrors reach the retracted position or the deployed position Thus, in the fifth aspect, providing a permissible range for the detected operating times enables an offset in the timings at which the door mirrors reach the retracted position or the deployed position to be prevented from arising.

A sixth aspect of the present disclosure is the door mirror control device of any one of the first aspect to the fifth aspect, wherein a standard operating time and a permissible range based on the standard operating time are set for one of the pair of door mirrors. Further, in cases in which the detected operating time of the door mirror for which the standard operating time has been set is outside the permissible range set based on the standard operating time, the changing section changes the magnitude setting of the drive voltage such that the operating time for this door mirror to operate from one of the retracted position or the deployed position to the other of the retracted position or the deployed position is set to the standard operating time.

In the sixth aspect, in cases in which the detected operating time is far outside a predetermined standard operating time, a drive voltage setting is changed such that the operating time returns to the standard operating time. This enables an increase in the time for the door mirrors to move to the retracted position or the deployed position, with a consequential detrimental effect on the sense of luxury of the vehicle, to be prevented.

Advantageous Effects of Invention

As described above, in the present disclosure, operating times are detected based on changes in current when door mirrors are moved from one of a retracted position or a deployed position to the other of the retracted position or the deployed position, thus enabling the timings at which left and right door mirrors reach the retracted position or the deployed position to be appropriately matched to one another. The present disclosure accordingly imparts a sense of luxury to a vehicle provided with such door mirrors.

BRIEF DESCRIPTION OF DRAWINGS

FIG. 4(A) illustrates operating current of a left door mirror. FIG. 4(B) illustrates drive voltage of a left door mirror. FIG. 4(C) illustrates operating current of a right door mirror. FIG. 4(D) illustrates drive voltage of a right door mirror.

FIG. 6 is a flowchart illustrating an example of door mirror retraction and deployment processing.

FIG. 9(A) illustrates operating current of a left door mirror. FIG. 9(B) illustrates drive voltage of a left door mirror. FIG. 9(C) illustrates operating current of a right door mirror. FIG. 9(D) illustrates drive voltage of a right door mirror.

DESCRIPTION OF EMBODIMENTS

Figure 2:
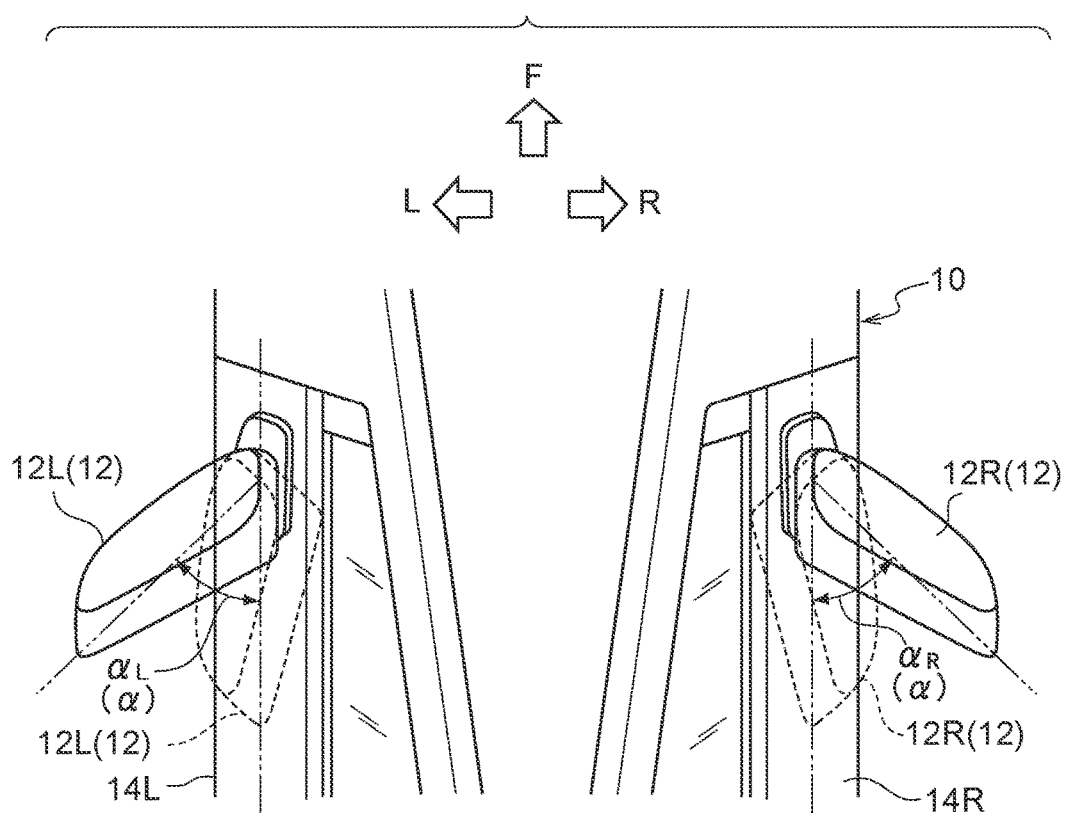
FIG. 2 is a schematic plan view of relevant portions of a vehicle, illustrating retraction and deployment of door mirrors according to an exemplary embodiment.

Detailed explanation follows regarding an example of an exemplary embodiment of the present disclosure, with reference to the drawings. FIG. 2 illustrates relevant portions of a vehicle 10 according to the present exemplary embodiment. In the present exemplary embodiment, the vehicle 10 is, for example, what is known as a right-hand drive passenger vehicle, in which the driving seat is on the right side of the vehicle. Note that in the following explanation, the arrow F indicates the vehicle front, the arrow L indicates left in the vehicle width direction, and the arrow R indicates right in the vehicle width direction.

The vehicle 10 is provided with door mirrors 12, which are examples of rear-view mirrors on a vehicle exterior for depicting areas behind the vehicle. On the vehicle 10, for example, a base 16 is fixed to each of a driver-side door (for example, a door outer panel of a door on the right side the vehicle) 14R and a front-passenger-side door (a door on the left side the vehicle) 14L. An end portion of each door mirror 12 that follows the specular surface of a non-illustrated mirror is pivotally attached to the respective base 16.

Each door mirror 12 is held in either a state of normal use, in which its specular surface is disposed running along the vehicle width direction such that the door mirror 12 is pointed behind the vehicle (a deployed state, illustrated by solid lines in FIG. 2; hereafter, this position is referred to as the deployed position), or in a state in which a leading end portion of the door mirror 12 is pointed toward the vehicle rear (a retracted state, illustrated by dashed lines in FIG. 2, in which the specular surface is pointed inwards in the vehicle width direction; hereafter, this position is referred to as the retracted position). The door mirrors 12 are folding mirrors that, upon receiving an external force, fold in accordance with the direction of the received external force. Note that known configuration is applied for the pivoting mechanism of the door mirrors 12, and so detailed explanation thereof is omitted in the present exemplary embodiment.

Figure 1:
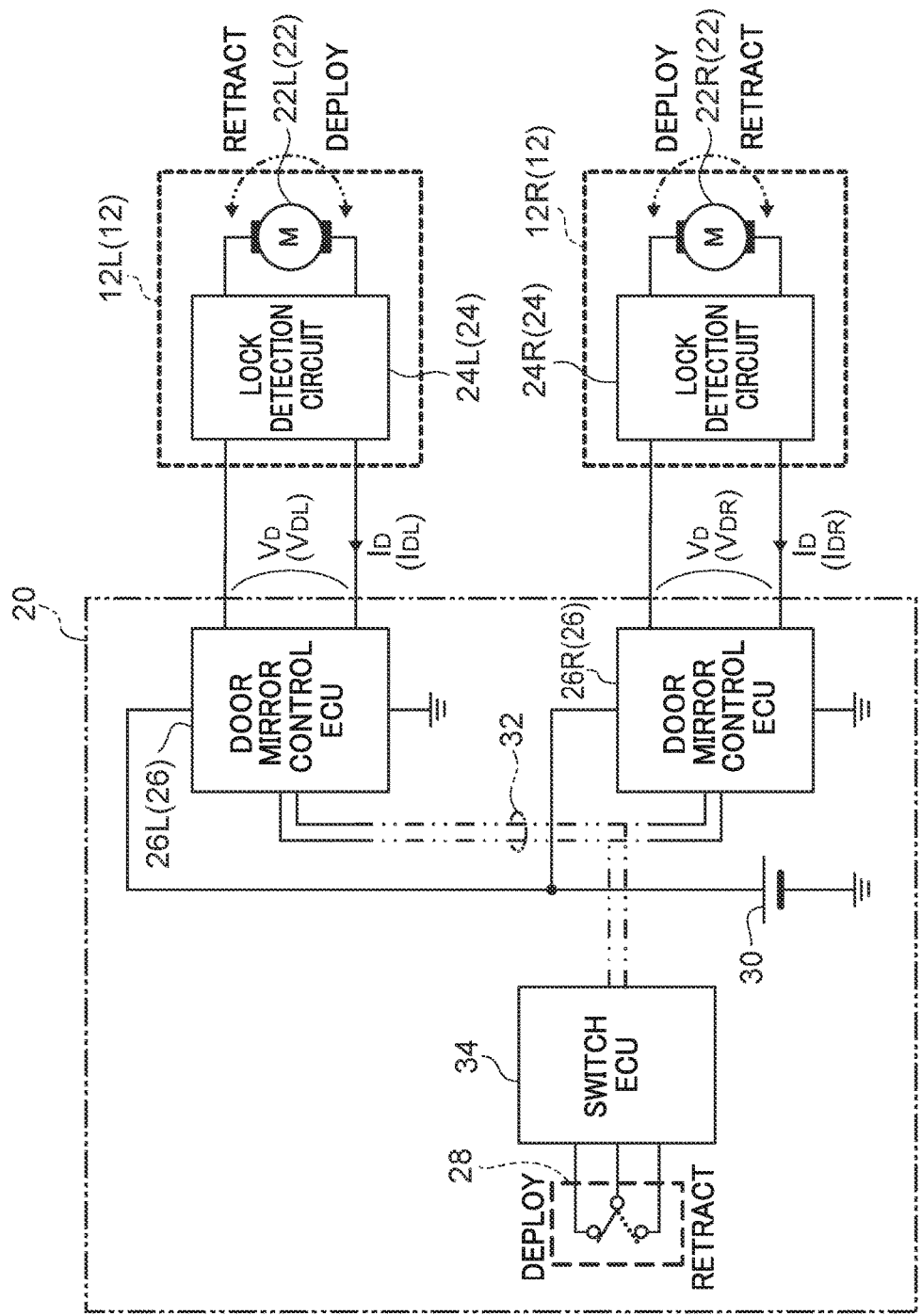
FIG. 1 is a schematic configuration diagram of door mirrors and a door mirror control device according to an exemplary embodiment.

FIG. 1 illustrates a door mirror control device 20 according to the present exemplary embodiment. In the present exemplary embodiment, the door mirrors 12 are electronically retractable, and each of the door mirrors 12 is connected to the door mirror control device 20 such that the door mirror control device 20 can control each door mirror 12 so as to move from one of the retracted position or the deployed position toward the other of the retracted position or the deployed position until the door mirror 12 reaches the other of the retracted position or the deployed position. The door mirror control device 20 according to the present exemplary embodiment functions, for example, as a door mirror control device. Note that in the following explanation, a movement direction from one of the retracted position or the deployed position to the other of the retracted position or the deployed position is referred to as either a retraction direction or a deployment direction. The basic configuration of the door mirror control device 20 explained below is such that configuration for the right door mirror 12R is similar to configuration for the left door mirror 12L, and in cases in which a distinction is made between left and right, R is appended to the reference numerals of functional components corresponding to the right door mirror 12R and L is appended to the reference numerals of functional components corresponding to the left door mirror 12L. The door mirror control device 20 according to the present exemplary embodiment may also include remote control functionality to make adjustments to the positions of the specular surfaces (adjustments to the angles of the specular surfaces) of the door mirrors 12.

In the present exemplary embodiment, each of the door mirrors 12 (12R, 12L) connected to the door mirror control device 20 includes a motor 22 (22R, 22L) and a lock detection circuit 24 (24R, 24L). Each door mirror 12 is provided with a pivoting mechanism, and by rotationally driving a rotation shaft of the respective motor 22, each door mirror 12 pivots toward either the deployed position or the retracted position in accordance with the rotation direction of the rotation shaft and at a speed corresponding to the rotation speed of the rotation shaft. In the present exemplary embodiment, each lock detection circuit 24 functions as example of a lock detection section.

The door mirror control device 20 includes door mirror control electronic control units (ECUs) 26 that control retraction and deployment of the door mirrors 12, and an electric switch 28. In the present exemplary embodiment, for example, a door mirror control ECU 26R that controls retraction and deployment of the right door mirror 12R and a door mirror control ECU 26L that controls retraction and deployment of the left door mirror 12L are employed as the door mirror control ECUs 26. In the door mirror control device 20, the lock detection circuit 24R of the right door mirror 12R is connected to the door mirror control ECU 26R, and lock detection circuit 24L of the left door mirror 12L is connected to the door mirror control ECU 26L.

The door mirror control ECU 26R and the door mirror control ECU 26L of the door mirror control device 20 are connected to a battery 30 provided at the vehicle 10. The door mirror control ECUs 26R, 26L operate on DC power at a voltage $V_B$ supplied from the battery 30, and the door mirror control ECUs 26R, 26L control the supply of drive voltages $V_D$ for driving the motors 22.

The door mirror control ECU 26R and the door mirror control ECU 26L of the door mirror control device 20 are connected together by network lines 32, and, for example, employ the Controller Area Network (CAN) protocol to transmit information to each other. Information is transmitted between the door mirror control ECU 26R and the door mirror control ECU 26L in the door mirror control device 20 such that the door mirror control ECU 26R and the door mirror control ECU 26L operate in synchronization with one another.

The electric switch 28 is provided at a typical position such as on an instrument panel, on door trim of the driver-side door 14R, or on the center console. A known configuration, in which the electric switch 28 is operated to a retract side when the door mirrors 12 are to be retracted and in which the electric switch 28 is operated to a deploy side when retracted door mirrors 12 are to be deployed, is applied for the electric switch 28. The electric switch 28 is, for example, connected to a switch ECU 34, and the switch ECU 34 is connected to each of the door mirror control ECUs 26R, 26L via the network lines 32. When the electric switch 28 is operated to the retract side or the deploy side, the switch ECU 34 outputs an operation signal corresponding to the operation of the electric switch 28 to the door mirror control ECUs 26. When input with the operation signal, the door mirror control ECUs 26 output preset drive voltages $V_D$ to the lock detection circuits 24 of the door mirrors 12 in correspondence with the input operation signal so as to drive the motors 22 of the door mirrors 12 and move the door mirrors 12 to the retracted position or the deployed position.

Note that in the following explanation, the door mirror control ECUs 26 are mainly described as moving the door mirrors 12 to the retracted position or the deployed position in accordance with the operation of the electric switch 28. However, movement of the door mirrors 12 to the retracted position or the deployed position is not limited thereto. The door mirror control ECUs 26 may, for example, be configured to move the door mirrors 12 to the deployed position as a result of an accessory (ACC) ON operation of a non-illustrated ignition switch and move the door mirrors 12 to the retracted position as a result of an ACC OFF operation of the ignition switch. Further, in a vehicle provided with a keyless entry system, the doors may be opened and closed using a wireless key (portable device) such as a Smart Key (trade name). When provided at such a vehicle, the door mirror control ECUs 26 may be configured perform coordinated control such that the door mirrors 12 move to the deployed position in coordination with the doors being unlocked using a wireless key and such that the door mirrors 12 move to the retracted position in coordination with the doors being locked using the wireless key.

Figure 3:
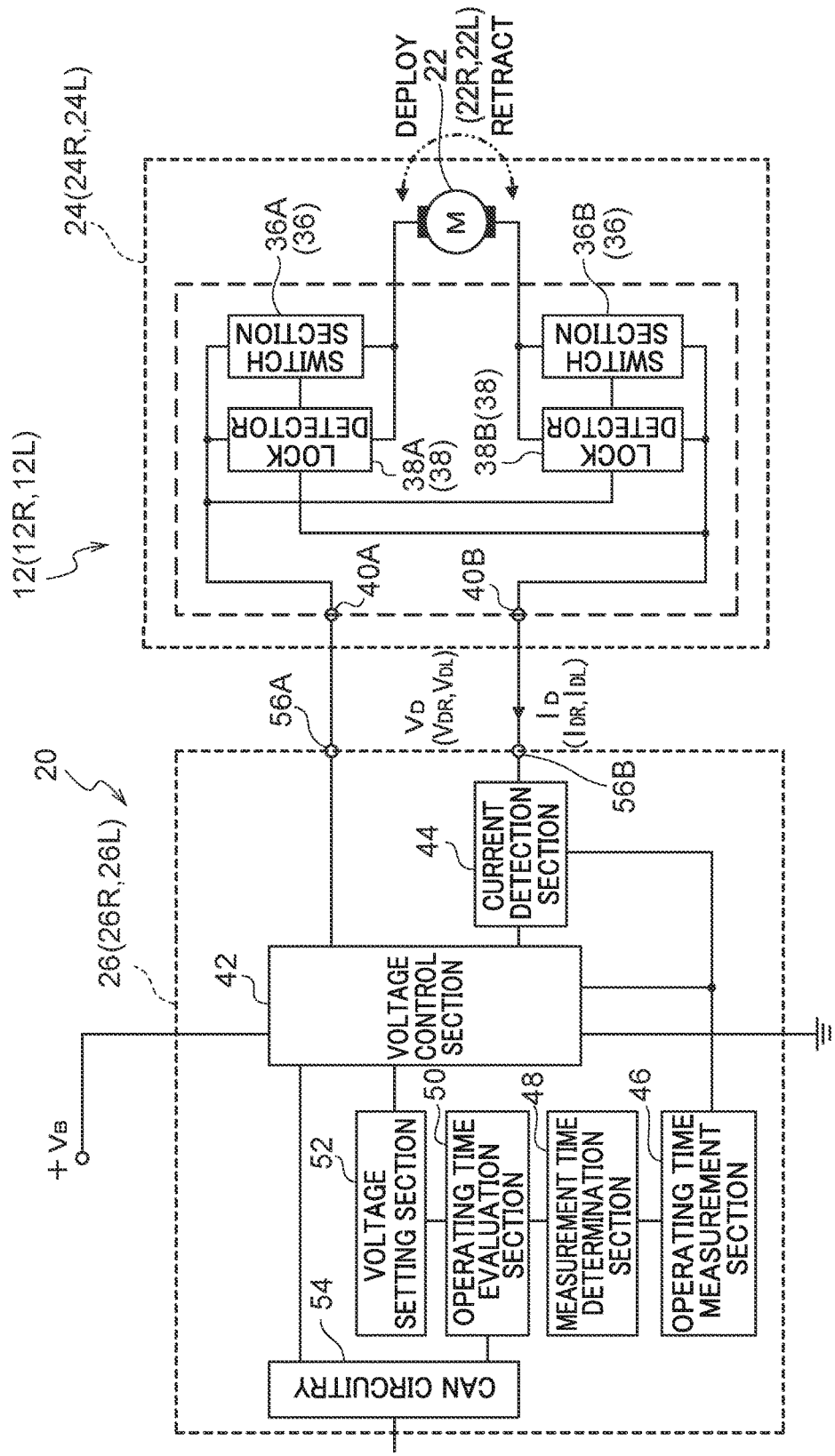
FIG. 3 is a functional block diagram illustrating an example of door mirrors and a door mirror control device according to an exemplary embodiment.

FIG. 3 illustrates the schematic configuration of the lock detection circuits 24 and the door mirror control ECUs 26 of the door mirrors 12 according to the present exemplary embodiment. Each lock detection circuit 24 is, for example, provided with a pair of switch sections 36A, 36B (referred to collectively as switch sections 36) and provided with lock detectors 38A, 38B (referred to collectively as lock detectors 38) that respectively correspond to the switch sections 36A, 36B. Each of the switch sections 36 is, for example, provided with an n-channel metal-oxide-semiconductor field-effect transistor (MOSFET; not illustrated in the drawings). Each of the switch sections 36 is also, for example, provided with a resistor of a predetermined resistance value or a positive temperature coefficient (PTC) thermistor, and each of the lock detection detectors 38 is provided with a transistor such as a bipolar transistor.

In each lock detection circuit 24, in accordance with the polarity of the drive voltage $V_D$ supplied to terminals 40A, 40B, one of the lock detectors 38A, 38B turns the MOSFET of the corresponding switch section 36A, 36B ON, and the MOSFET corresponding to the other of the lock detectors 38A, 38B adopts a conductive state owing to its parasitic diode. Each lock detection circuit 24 thereby supplies a voltage and a polarity corresponding to its drive voltage $V_D$ to the respective motor 22, and each motor 22 is rotationally driven at a rotation speed corresponding to the voltage of the respective drive voltage $V_D$ and in a rotation direction (the deployment direction or the retraction direction) corresponding to the polarity of the respective drive voltage $V_D$. Namely, each door mirror 12 pivoted in the deployment direction or the retraction direction in accordance with the polarity applied to the terminals 40A, 40B of the respective lock detection circuit 24, at a speed corresponding to the respective drive voltage $V_D$.

Each motor 22 adopts a locked state and current flowing through the motor 22 increases if the respective door mirror 12 reaches the deployed position or the retracted position. Since the switch sections 36 in the respective lock detection circuit 24 are provided with resistors or PTC thermistors, the voltage applied to the lock detectors 38 increases in accordance with the increase in current flowing through the respective motor 22. When the voltage applied to the lock detector 38 corresponding to the switch section 36 that has been switched ON exceeds a preset threshold value, the non-illustrated bipolar transistor switches ON, and the MOSFET of the corresponding switch section 36 is switched OFF. The lock detection circuit 24 thereby stops voltage supply to the motor 22 so as to stop driving the motor 22. The lock detectors 38 are also formed with a delay means employing an integrated circuit or the like so as to prevent voltage supply to the motor 22 from being stopped by a surge, for example.

Note that the lock detection circuit 24 can be applied with a variety of configurations, such as that including a protection means for protecting circuit components from surges (for example, the configuration described in JP-A No. 2012-105425). Moreover, the lock detection sections provided at the door mirrors 12 are not limited to the lock detection circuits 24, and any desired configuration can be applied in which a voltage and a polarity corresponding to the drive voltage $V_D$ are supplied to the respective motor 22, and voltage supply to the motor 22 is stopped when the door mirror 12 reaches the retracted position or the deployed position and the motor 22 adopts a locked state.

The door mirror control ECUs 26 according to the present exemplary embodiment each include a voltage control section 42, a current detection section 44, an operating time measurement section 46, a measurement time determination section 48, an operating time evaluation section 50, a voltage setting section 52, and CAN circuitry 54. In the present exemplary embodiment, the voltage control section 42 functions, for example, as a voltage supply section; and the current detection section 44, the operating time measurement section 46, and the measurement time determination section 48 function, for example, as a detection section. Further, in the present exemplary embodiment, the operating time evaluation section 50 and the voltage setting section 52 function, for example, as a changing section.

Each door mirror control ECU 26 includes, for example: a microcomputer of a typical configuration in which a CPU, ROM, RAM, etc., are connected together via a bus; an input/output interface; a non-volatile storage medium; various driver circuits; and the like (none of which are illustrated in the drawings). In each door mirror control ECU 26, the CPU reads programs stored in ROM, the non-volatile storage medium, or the like, expands the program into RAM, and executes the program that has been expanded into RAM.

The programs executed by the CPU of each door mirror control ECU 26 according to the present exemplary embodiment include a voltage control program, a current detection program, an operating time measurement program, an operating time determination program, an operating time evaluation program, and a voltage setting program. The CPU executes these programs to cause the non-illustrated microcomputer provided at the respective door mirror control ECU 26 to function as the voltage control section 42, the current detection section 44, the operating time measurement section 46, the measurement time determination section 48, the operating time evaluation section 50, and the voltage setting section 52. The microcomputer provided at each door mirror control ECU 26 also communicates (exchanges information) using the CAN circuitry 54. Note that although the voltage control section 42, the current detection section 44, the operating time measurement section 46, the measurement time determination section 48, the operating time evaluation section 50, and the voltage setting section 52 are, for example, formed through software in the present exemplary embodiment, there is no limitation thereto, and these may be formed through hardware.

The voltage control section 42 of each door mirror control ECU 26 adjusts a voltage $V_B$ supplied from the battery 30 to the preset drive voltage $V_D$ ($V_{DR}$, $V_{DL}$). When the voltage control section 42 is input with an operation signal from the electric switch 28 (see FIG. 1) via the CAN circuitry 54, the voltage control section 42 outputs, from terminals 56A, 56B, the drive voltage $V_D$, with a polarity corresponding to the operation signal, to the terminals 40A, 40B of the respective lock detection circuit 24 connected to the terminals 56A, 56B. The respective door mirror 12 thereby operates in accordance with the operation signal so as to pivot in the retraction direction or deployment direction.

The current detection section 44 is, for example, provided between the voltage control section 42 and the terminal 56B, and when the respective motor 22 is driven, a current value that changes in accordance with the driving of the motor 22 is detected by the current detection section 44 as an operating current $I_D$ of the door mirror 12. When the voltage control section 42 determines, from the operating current $I_D$ detected by the current detection section 44, that the motor 22 of the respective door mirror 12 has stopped, for example when the operating current $I_D$ becomes zero ($I_D=0$), the voltage control section 42 stops supply of the drive voltage $V_D$ to the door mirror 12.

Figure 4:
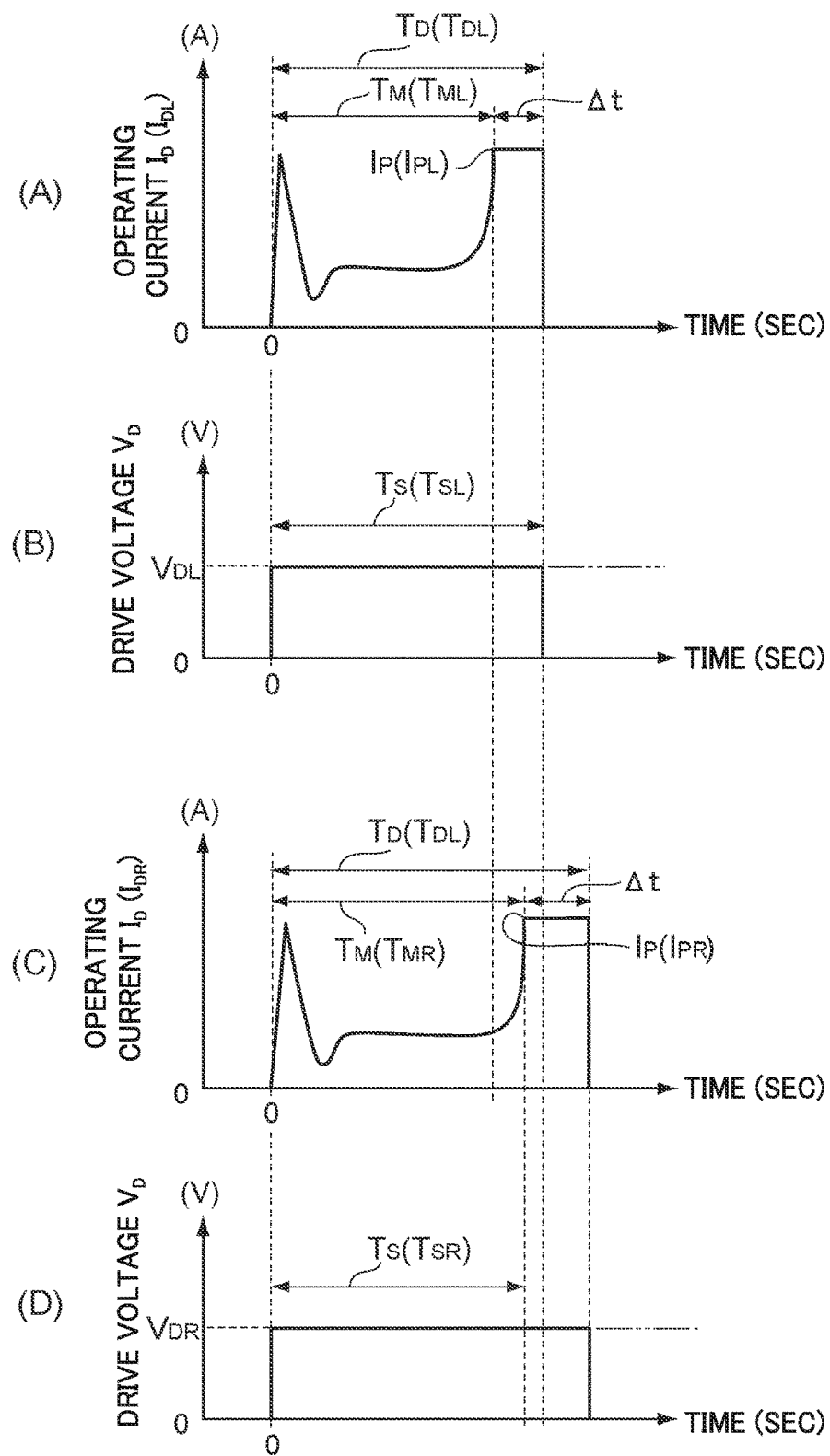
FIG. 4(A) to FIG. 4(D) are line graphs illustrating examples of change in drive voltage and operating current.

FIG. 4(B) and FIG. 4(D) illustrate examples of change in the drive voltages $V_D$ output from the voltage control sections 42, and FIG. 4(A) and FIG. 4(C) illustrate examples of change in the operating currents $I_D$ of the door mirrors 12 detected by the current detection sections 44. Note that FIG. 4(A) and FIG. 4(B) correspond to the left door mirror 12L (the door mirror control ECU 26L), and FIG. 4(C) and FIG. 4(D) correspond to the right door mirror 12R (door mirror control ECU 26R).

In the following explanation, the interval of time over which each voltage control section 42 outputs the drive voltage $V_D$ is referred to as a supply time $T_S$ ($T_{SR}$, $T_{SL}$), and the interval of time over which each lock detection circuit 24 applies a voltage corresponding to the respective drive voltage $V_D$ to the motor 22 is referred to as a drive time $T_D$ ($T_{DR}$, $T_{SL}$). Further, the interval of time over which each motor 22 is driven so as to pivotally operate the respective door mirror 12 is the time it takes the motor 22 to reach the locked state. Accordingly, in the present exemplary embodiment, the interval of time from starting the supply of the drive voltage $V_D$ until the respective motor 22 reaches the locked state is used as an example of the interval of time over which each door mirror 12 is pivotally operated, and this interval of time is referred to as an operating time $T_M$ ($T_{MR}$, $T_{ML}$).

As illustrated in FIG. 4(A) and FIG. 4(C), the operating current $I_D$ ($I_{DR}$, $I_{DL}$) is detected when the drive voltage $V_D$ ($V_{DR}$, $V_{DL}$) is output (see FIG. 4(B) and FIG. 4(D)) such that the motor 22 starts driving. Each motor 22 adopts the locked state when the respective door mirror 12 reaches the retracted position or the deployed position, and what is referred to as a lock current flows. When each motor 22 adopts the locked state, the respective operating current $I_D$ reaches a peak value $I_P$ ($I_{PR}$, $I_{PL}$), and this peak value $I_P$ is maintained until the lock detection circuit 24 stops voltage supply to the motor 22. As a result, the operating current $I_D$ detected by the current detection section 44 drops (for example, $I_D=0$). As illustrated in FIG. 4(B) and FIG. 4(D), when the voltage control section 42 has determined, from the operating current $I_D$, that the respective motor 22 has stopped, the voltage control section 42 stops outputting the drive voltage $V_D$, namely stops supplying the drive voltage $V_D$ to the lock detection circuit 24 of the respective door mirror 12.

Note that, as illustrated in FIG. 2, an angle α between the deployed position and the retracted position differs for the right door mirror 12R and the left door mirror 12L. For example, in the right-hand drive vehicle 10, the angle $α_L$ for the front-passenger-side left door mirror 12L is smaller than the angle $α_R$ for the driver-side right door mirror 12R ($α_L < α_R$).

Accordingly, the amount of movement (amount of pivot) from one of the retracted position or the deployed position to the other of the retracted position or the deployed position differs for the right door mirror 12R and the left door mirror 12L, with the amount of movement of the right door mirror 12R being greater than that of the left door mirror 12L. Due to the amounts of movement being different, in cases in which, for example, the right door mirror 12R and the left door mirror 12L pivot at the same speed (for example, using the same drive voltage $V_D$), the left door mirror 12L will reach the retracted position or the deployed position faster than the right door mirror 12R. Namely, as illustrated in FIG. 4(A) and FIG. 4(C), the operating time $T_{MR}$ corresponding to the interval of time over which the right door mirror 12R is pivotally operated is longer than the operating time $T_{ML}$ corresponding to the interval of time over which the left door mirror 12L is pivotally operated ($T_{MR}>T_{ML}$).

Further, the speed at which each door mirror 12 pivots in the retraction direction or the deployment direction differs depending on the drive voltage $V_D$ supplied to the door mirror 12, with speed dropping as the drive voltage $V_D$ decreases. In addition, the speed of rotation of each motor 22 with respect to voltage may change over time. An offset (time difference) in the timings at which the right door mirror 12R and the left door mirror 12L reach the retracted position or the deployed position may therefore arise, or an offset in the timings at which the retracted position or the deployed position is reached may increase.

The door mirror control device 20 according to the present exemplary embodiment sets at least one of the drive voltage $V_{DR}$ of the right door mirror 12R or the drive voltage $V_{DL}$ of the left door mirror 12L such that the operating time $T_{MR}$ of the right door mirror 12R and the operating time $T_{ML}$ of the left door mirror 12L match each other. The door mirror control device 20 changes the magnitude (size) of the voltage (drive voltage $V_D$) output by each voltage control section 42 such that the drive voltage $V_D$ that had been set is output from the voltage control section 42. Namely, the door mirror control device 20 changes a magnitude (value) setting of at least one of the drive voltage $V_{DR}$ or the drive voltage $V_{DL}$ based on the operating times $T_{MR}$, $T_{ML}$ such that the timings at which the right door mirror 12R and the left door mirror 12L reach the retracted position or the deployed position match each other.

Note that in the vehicle 10 provided with the door mirror control device 20 to which the present exemplary embodiment has been applied, the amount of movement of the right door mirror 12R is greater than the amount of movement of the left door mirror 12L, and ordinarily, the operating time $T_{MR}$ of the right door mirror 12R would be longer than the operating time $T_{ML}$ of the left door mirror 12L. Thus, in the present exemplary embodiment, for example, with reference to the driver-side right door mirror 12R having the greater amount of movement, the drive voltage $V_{DL}$ setting of the left door mirror 12L is changed so as to match the operating time $T_{ML}$ of the left door mirror 12L with the operating time $T_{MR}$ of the right door mirror 12R.

In addition, with respect to the right door mirror 12R, the operating time $T_{MR}$ may, for example, become longer than the operating time $T_{ML}$ of the left door mirror 12L as a result of changes over time. Thus, in the present exemplary embodiment, a standard operating time $T_{MS}$ is set for the right door mirror 12R, and in cases in which the operating time $T_{MR}$ of the right door mirror 12R has changed with respect to the standard operating time $T_{MS}$ by at least a preset percentage (for example, in cases in which the operating time $T_{MR}$ is at least 10% longer than the standard operating time $T_{MS}$), the drive voltage $V_{DR}$ setting is changed such that the operating time $T_{MR}$ of the right door mirror 12R returns to the standard operating time $T_{MS}$.

In the present exemplary embodiment, initial values for the drive voltages $V_D$ (drive voltage $V_{DR}$, drive voltage $V_{DL}$) and the standard operating time $T_{MS}$ are set when, for example, the door mirror control device 20 is attached to the vehicle 10 (for example, during production, delivery, or maintenance of the vehicle 10). When this is performed, the voltage $V_B$ of the battery 30 is, for example, applied as the initial values of the drive voltages $V_{DR}$, $V_{DL}$ ($V_{DR}=V_B$, $V_{DL}=V_B$). Further, the operating time $T_{MR}$ when the right door mirror 12R is retracted or deployed using the initial value of the drive voltage $V_{DR}$ is, for example, applied as the standard operating time $T_{MS}$.

The operating time measurement sections 46 provided at the door mirror control ECUs 26 read changes in the operating current $I_D$ detected by the respective current detection section 44. The operating time measurement section 46 measure, from changes in the read operating current $I_D$, the interval of time until the respective motor 22 reaches the locked state.

Each door mirror 12 is provided with the lock detection circuit 24 to detect the locked state of the respective motor 22, and the motor 22 stops when the motor 22 reaches the locked state. The lock detection circuit 24 is formed with a delay means or the like in order to generally prevent mistaken detection of the locked state of the motor 22. Thus, as illustrated in FIG. 4(A) and FIG. 4(B), there is, for example, a time difference Δt of at least 0.1 sec between the operating time $T_M$, which corresponds to an length of time until the door mirror 12 reaches the retracted position or the deployed position, and the drive time $T_D$ lasting until the driving of the motor 22 stops. The time difference Δt differs depending on the configuration of the lock detection circuit 24 provided as the lock detection section. A variety of configurations may be applied as a lock detection section, such as the lock detection circuit 24, and so the time difference Δt may differ depending on the manufacturer or the model of the door mirror 12. Accordingly, even if drive voltage $V_{DR}$, $V_{DL}$ settings are changed based on a supply time $T_{SR}$ for supplying a drive voltage $V_D$ to the right door mirror 12R and a supply time $T_{SL}$ for supplying a drive voltage $V_D$ to the left door mirror 12L, it is difficult to have the timings at which the right door mirror 12R and the left door mirror 12L reach the retracted position or the deployed position agree with one another.

Thus, the operating time measurement sections 46 illustrated in FIG. 3 determine, from the value of the respective operating current $I_D$, the timing at which the motor 22 reaches the locked state, and finds the respective operating time $T_M$ from changes in the value of the operating current $I_D$ up until that point. When this occurs, the peak value $I_P$ of the operating current $I_D$ is maintained due to the respective motor 22 adopting the locked state (see FIG. 4(A) and FIG. 4(C)). Each operating time measurement section 46 looks back on changes in the operating current $I_D$ to determine the length of time it took for the operating current $I_D$ to reach its peak value $I_P$ (the length of time it took for the operating current $I_D$ to increase to its peak value $I_P$), and the operating time $T_M$ is measured to be the interval of time from when the supply of the drive voltage $V_D$ starts up until the peak value $I_P$ is reached.

In the door mirror control device 20, the measured operating times $T_M$ are used to change drive voltage $V_D$ settings, and each measurement time determination section 48 determines whether or not the operating time $T_M$ found by the operating time measurement section 46 is appropriate for changing a respective drive voltage $V_D$ setting. The door mirror 12 is a folding mirror, and when the door mirror 12 receives an external force greater than a predetermined strength, a non-illustrated clutch that is provided at the pivoting mechanism, which causes the door mirror 12 to pivot using rotation from the motor 22, is disengaged and the door mirror 12 folds toward the vehicle front or the vehicle rear. When the electric switch 28 is operated to the retract side, the door mirror control device 20 moves the door mirrors 12 to the retracted position, even when in a state folded toward the vehicle front or the vehicle rear.

Figure 5A:
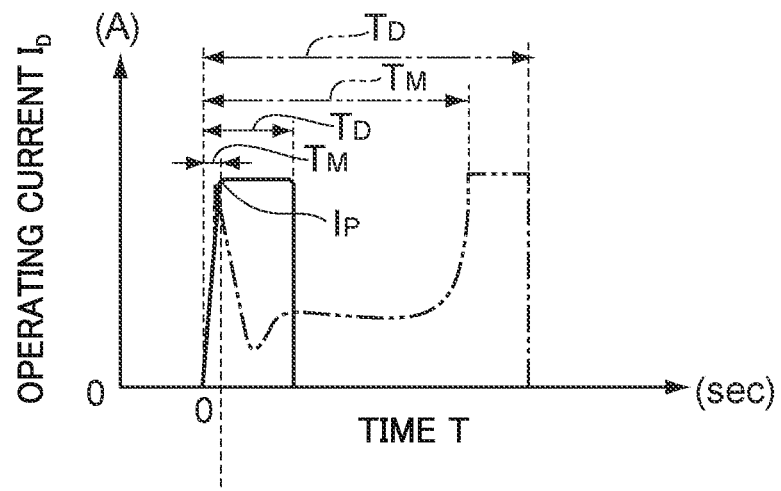
FIG. 5A is a line graph illustrating an example of change in operating current of a door mirror folded toward the vehicle rear when moved in a retraction direction.
Figure 5B:
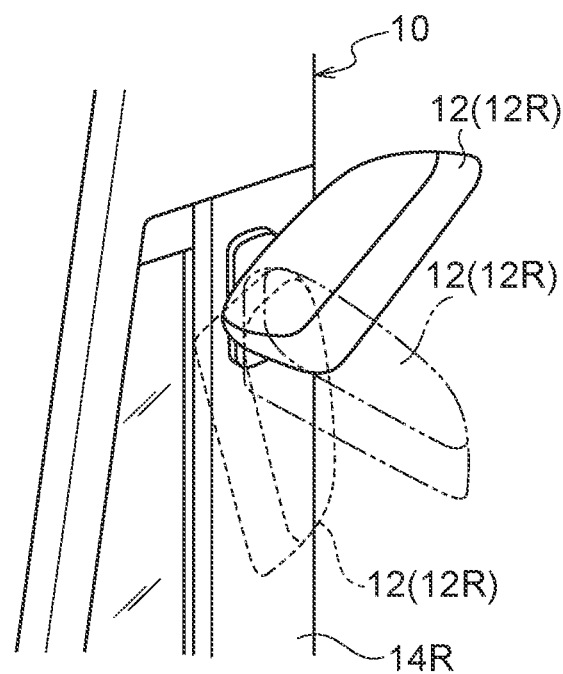
FIG. 5B is a schematic plan view of relevant portions of a vehicle, illustrating an example of a state in which a door mirror has been folded toward the vehicle front.
Figure 5C:
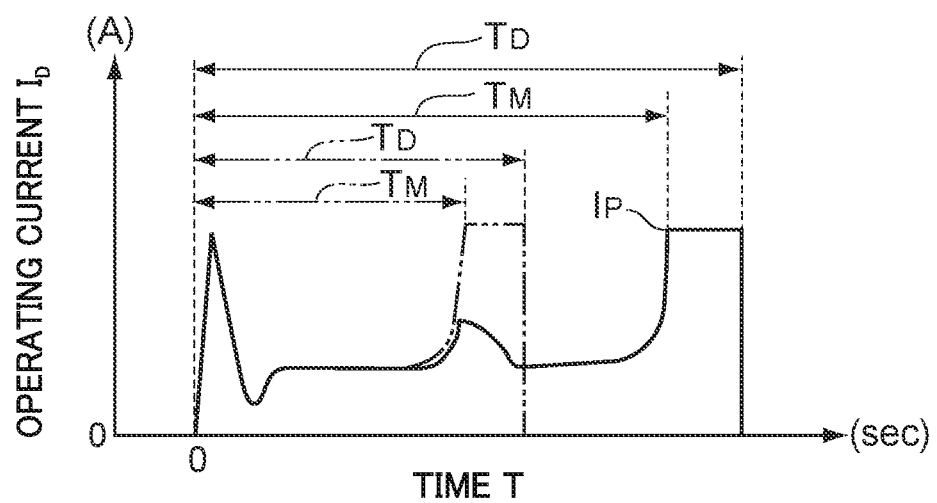
FIG. 5C is a line graph illustrating an example of change in operating current of the door mirror illustrated in FIG. 5B when moved in a retraction direction.

FIG. 5A illustrates an example of change in the operating current $I_D$, in a state in which the door mirror 12 has been folded toward the vehicle rear. FIG. 5B illustrates a state in which the door mirror 12 has been folded toward the vehicle front, and FIG. 5C illustrates an example of change in the operating current $I_D$ in cases in which the door mirror 12 has been retracted from the state folded toward the vehicle front illustrated in FIG. 5B. Note that double-dotted dashed lines in FIG. 5A and FIG. 5C illustrate examples of change in the operating current $I_D$ for cases in which the door mirror 12 has been pivoted from the deployed position to the retracted position. In FIG. 5B, a door mirror 12 folded toward the vehicle front is illustrated using solid lines, a door mirror 12 in the deployed position is illustrated using double-dotted dashed lines, and a door mirror 12 in the retracted position is illustrated using dashed lines.

As illustrated in FIG. 5A, when the motor 22 of a door mirror 12 folded toward the vehicle rear is rotationally driven, the door mirror 12 reaches the retracted position and the motor 22 stops in less time than in cases in which the door mirror 12 pivots from the deployed position. Thus, the operating current $I_D$ of the door mirror 12 reaches its peak value $I_P$ a short time after the motor 22 starts operating, and the operating time $T_M$ of the door mirror 12 is reduced compared to cases in which the door mirror 12 is moved from the deployed position illustrated using double-dotted dashed lines to the retracted position.

Further, as illustrated in FIG. 5B, in cases in which the door mirror 12 is moved to the retracted position from a state folded toward the vehicle front, the door mirror 12 passes through the deployed position before reaching the retracted position. Thus, as illustrated in FIG. 5C, the operating time $T_M$ until the operating current $I_D$ of the door mirror 12 reaches its peak value $I_P$ is longer than in cases in which the door mirror 12 is moved from the deployed position to the retracted position.

In the door mirror control device 20, each operating time $T_M$ has a preset reference value (referred to below as a reference operating time $T_{MC}$), and a permissible range (upper limit and lower limit) for each operating time $T_M$ employed in setting the respective drive voltage $V_D$ is determined based on this reference operating time $T_{MC}$.

The permissible range for each operating time $T_M$ is, for example, set having a time that is 90% of the reference operating time $T_{MC}$ as a lower limit time $T_{MLOW}$ ($T_{MLOW}=T_{MC}\times 0.9$), and having a time that is 110% of the reference operating time $T_{MC}$ as an upper limit time $T_{MHIGH}$ ($T_{MHIGH}=T_{MC}\times 1.1$). Moreover, the standard operating time $T_{MS}$ set in the right door mirror 12R may, for example, also be applied as the reference operating time $T_{MC}$. Moreover, the operating time $T_M$ employed to change the setting of a respective previous drive voltage $V_D$ may be employed as the reference operating time $T_{MC}$. In the present exemplary embodiment, for example, the operating time $T_M$ employed to change the setting of the respective previous drive voltage $V_D$ is employed as the reference operating time $T_{MC}$.

Namely, in cases in which a drive voltage $V_D$ ($V_{DL}$) is set so as to match the operating time $T_{MR}$ of the right door mirror 12R and the operating time $T_{ML}$ of the left door mirror 12L, the operating time $T_{MR}$ of the right door mirror 12R applied to change the setting of the previous drive voltage $V_D$ is used as the reference operating time $T_{MC}$.

In cases in which the operating time $T_M$ found by the operating time measurement section 46 is within the permissible range ($T_{MLOW} \leq T_M \leq T_{MHIGH}$), the measurement time determination section 48 determines that the operating time $T_M$ may be appropriately employed to change the respective drive voltage $V_D$ setting.

Each operating time evaluation section 50 compares the operating time $T_{MR}$ of the right door mirror 12R and the operating time $T_{ML}$ of the left door mirror 12L, and evaluates whether or not there is an offset in the timings at which the right door mirror 12R and the left door mirror 12L reach the retracted position or the deployed position. Namely, the operating time evaluation section 50 compares the operating times $T_{MR}$, $T_{ML}$ and evaluates whether or not an operating time $T_M$ adjustment is necessary among the right door mirror 12R and the left door mirror 12L, namely, whether a drive voltage $V_D$ setting change is necessary.

In the actual vehicle 10, whether or not the timings at which the right door mirror 12R and the left door mirror 12L reach the retracted position or the deployed position are in agreement is visually evaluated, and the timings can be considered to be in effective agreement if the time difference is, for example, less than about 0.2 sec. In the door mirror control device 20, a threshold value $\Delta T_S$ (for example, $\Delta T_S=0.2$ sec) for the time difference $\Delta T$ of the operating times $T_{MR}$, $T_{ML}$ ($\Delta T=T_{MR}-T_{mL}$) is set as the permissible range in which the timings at which the right door mirror 12R and the left door mirror 12L reach the retracted position or the deployed position are to be considered to agree. In cases in which the time difference $\Delta T$ found from the operating times $T_{MR}$, $T_{ML}$ is within a range of the threshold value $\Delta T_S$ ($-\Delta T_S \leq \Delta T \leq \Delta T_S$, with $0<\Delta T_S$), the timings at which the right door mirror 12R and the left door mirror 12L reach the retracted position or the deployed position are considered to be effectively matched, and the operating time evaluation section 50 makes the evaluation that it is necessary to change the setting of the drive voltage $V_D$. In cases in which the time difference $\Delta T$ exceeds the range of the threshold value $\Delta T_S$ of the operating times $T_{MR}$, $T_{ML}$ ($\Delta T<-\Delta T_S$ or $\Delta T_S<\Delta T$), there is an offset in the timings at which the right door mirror 12R and the left door mirror 12L reach the retracted position or the deployed position, and the operating time evaluation section 50 makes the evaluation that it is necessary to change the drive voltage $V_D$ setting.

If a change in a drive voltage $V_D$ setting has been evaluated to be necessary, at least one of the drive voltage $V_{DR}$ or the drive voltage $V_{DL}$ is set by the respective voltage setting section 52 based on the operating times $T_{MR}$, $T_{ML}$. When this occurs, with reference to the operating time $T_{MR}$ of the right door mirror 12R, a voltage setting section 52 sets the respective drive voltage $V_D$ ($V_{DL}$) such that the operating time $T_{ML}$ of the left door mirror 12L matches a operating time $T_{MR}$. In addition, when the operating time $T_{MR}$ of the right door mirror 12R is greater than the standard operating time $T_{MS}$ by at least a preset percentage (for example, the operating time $T_{MR}\times 110\%$), the voltage setting section 52 sets the drive voltage $V_{DR}$ such that the operating time $T_{MR}$ returns to the standard operating time $T_{MS}$. The voltage control section 42 changes the drive voltage $V_D$ to the drive voltage $V_D$ set by the voltage setting section 52 (for example, the drive voltage $V_{DL}$).

Figure 7:
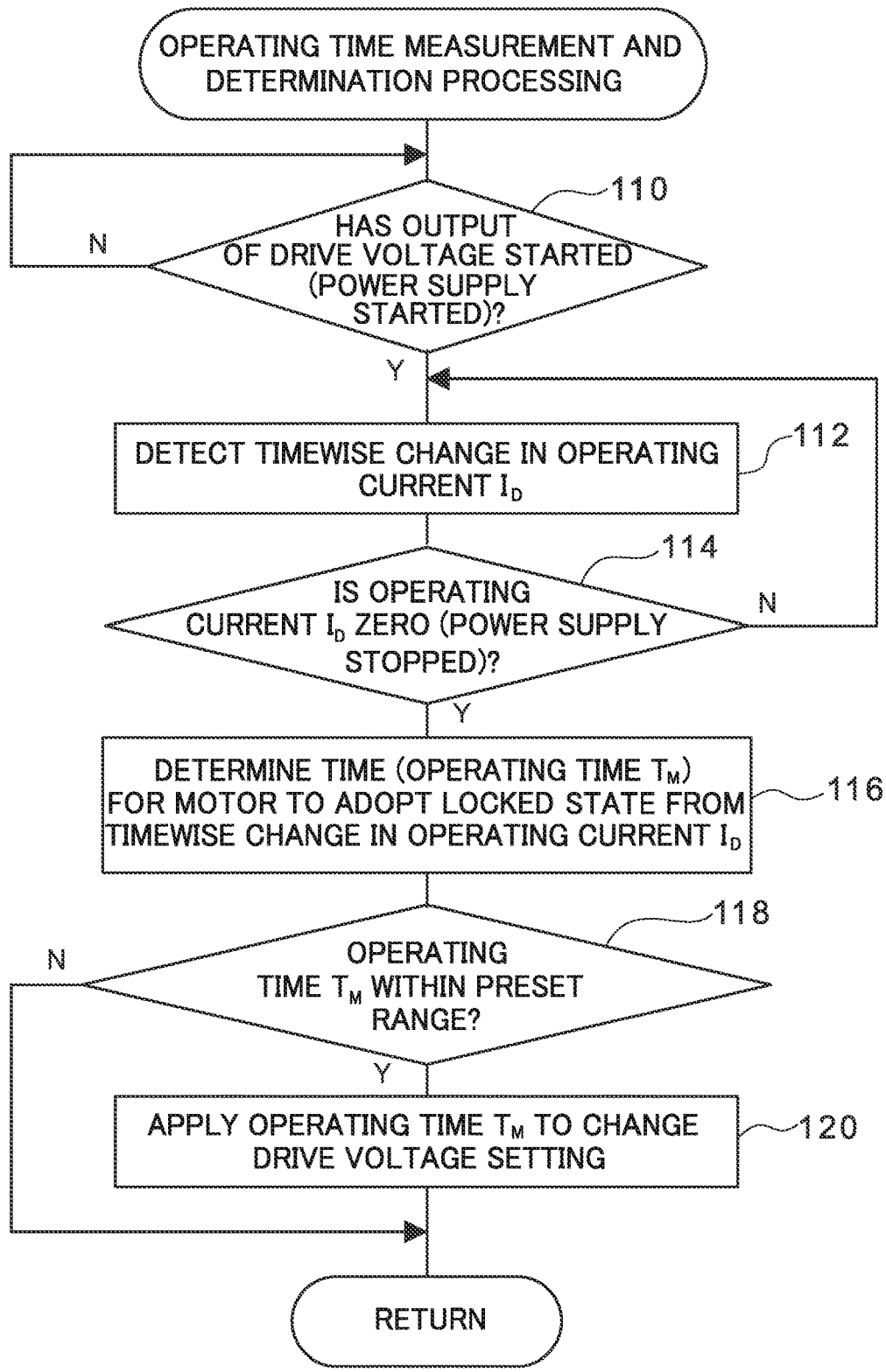
FIG. 7 is a flowchart illustrating an example of operating time measurement and determination processing according to an exemplary embodiment.
Figure 8:
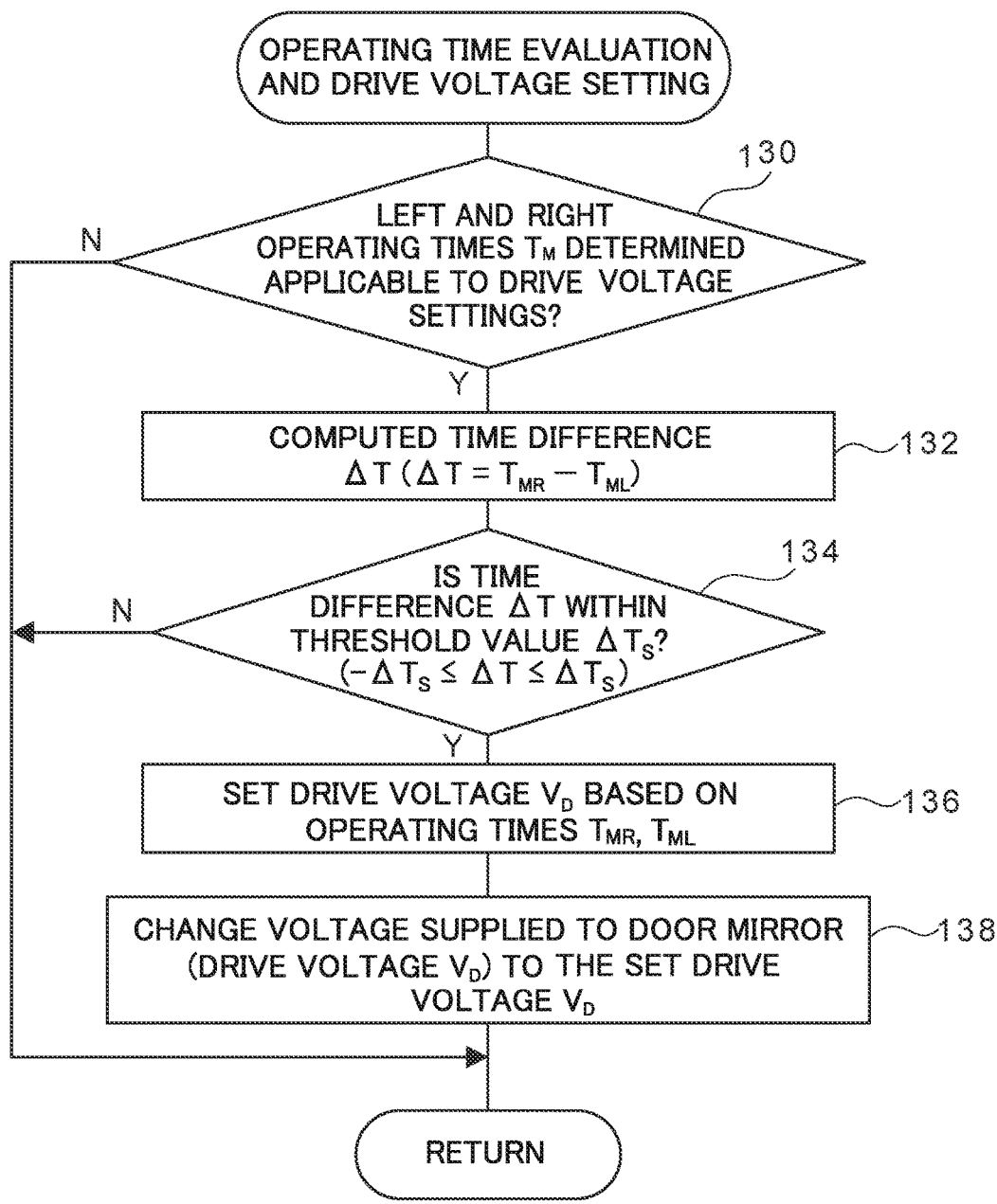
FIG. 8 is a flowchart illustrating an example of operating time evaluation and drive voltage setting processing according to an exemplary embodiment.
Figure 9:
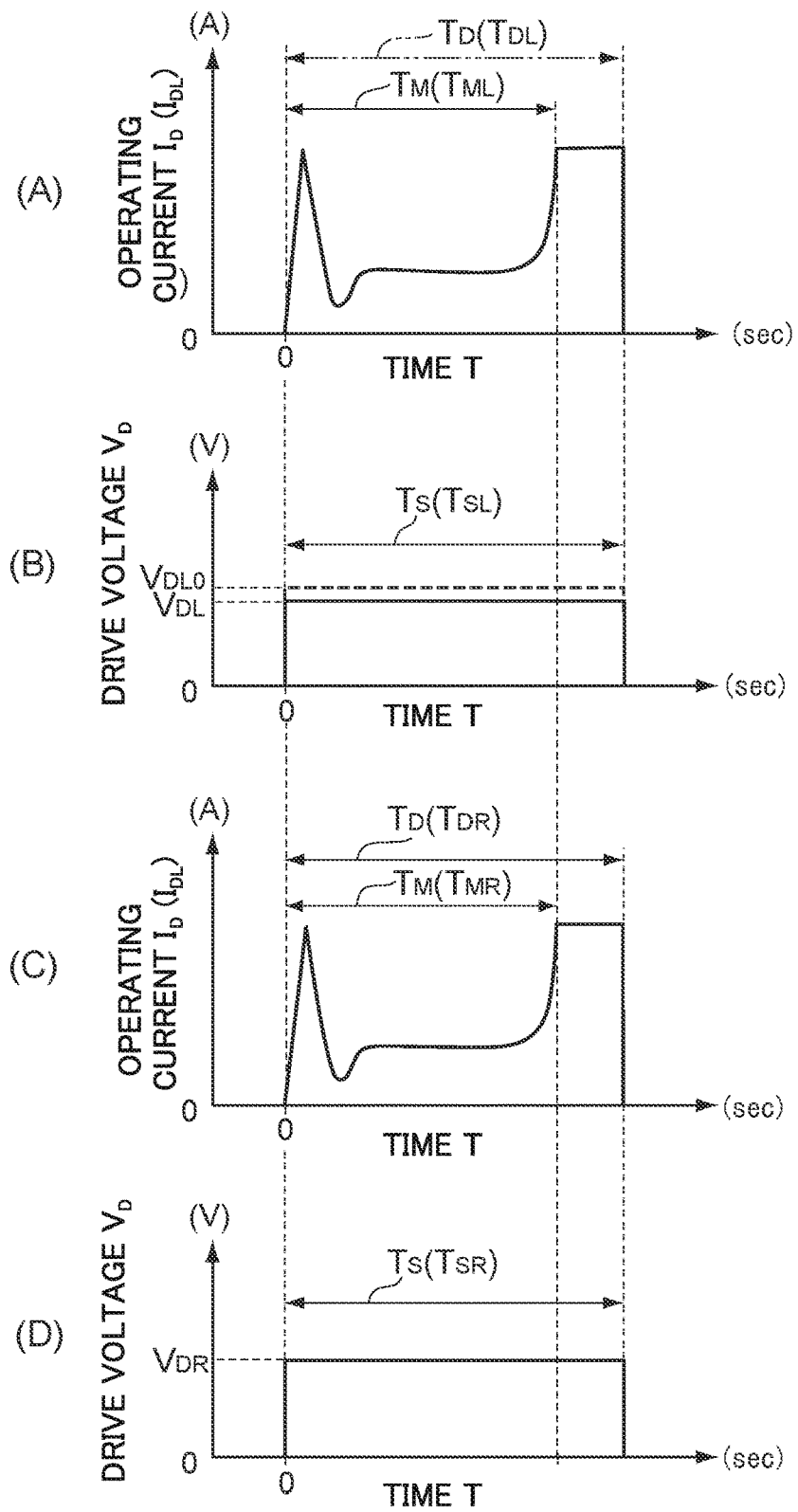
FIG. 9(A) to FIG. 9(D) are line graphs illustrating examples of change in drive voltage and operating current set based on operating time.

Regarding operation of the present exemplary embodiment, explanation follows regarding operation of the door mirror control device 20 with reference to FIG. 6 to FIG. 9. Note that in the present exemplary embodiment, the processing of FIG. 6 to FIG. 8 is executed by the door mirror control ECU 26R and the door mirror control ECU 26L, respectively, and here, explanation is given for the door mirror control ECUs 26.

The door mirror control device 20 begins operating when power is supplied from the battery 30 of the vehicle 10, and the door mirror control device 20 stops operating when the supply of power from the battery 30 stops. When operation starts, the door mirror control device 20 controls retraction and deployment of the door mirrors 12 in accordance with operation of the electric switch 28.

FIG. 6 illustrates an example of retraction and deployment processing for the door mirrors 12 according to operation of the electric switch 28. The door mirror control ECUs 26 (26R, 26L) of the door mirror control device 20 determines whether or not the electric switch 28 has been operated at an initial step S100. When the electric switch 28 has been operated to the side to retract the door mirrors 12 or the side to deploy the door mirrors 12, affirmative determination is made at step S100, and processing transitions to step S102. At step S102, a preset drive voltage $V_D$ having a polarity corresponding to the operation of the electric switch 28 (operation to the retract side or to the deploy side) is output to each door mirror 12 (power supply starts), and at step S104, the respective operating current $I_D$ is detected. When this occurs, the door mirror control ECU 26R outputs the drive voltage $V_{DR}$ to the lock detection circuit 24R of the right door mirror 12R and detects the operating current $I_{DR}$ of the right door mirror 12R. In addition, the door mirror control ECU 26L outputs a drive voltage $V_{DL}$ to the lock detection circuit 24L of the left door mirror 12L and detects the operating current $I_{DL}$ of the left door mirror 12L. Thus, each lock detection circuit 24 drives the respective motor 22 with a polarity and rotation speed corresponding to its drive voltage $V_D$ so as to cause the respective door mirror 12 to pivot in the retraction direction or the deployment direction, and stops voltage supply to the respective motor 22 when the respective door mirror 12 reaches the retracted position or the deployed position and the motor 22 adopts the locked state.

The door mirror control ECUs 26 determine that the respective motor 22 has stopped when the operating current $I_D$ drops (for example, ID=0), and in cases in which affirmative determination is made at step S106, processing transitions to step S108 and output of the drive voltage $V_D$ stops (power supply stops). Note that the door mirror control device 20 may, for example, include functionality to deploy the door mirrors 12 when the ACC is switched ON to start operation and to retract the door mirror 12 when the ACC is switched OFF to end operation. The door mirror control device 20 may, for example, include functionality to deploy the door mirrors 12 in coordination with the doors being unlocked using a wireless key and to retract the door mirrors 12 in coordination with the doors being locked using a wireless key. In such cases, step S100 may be omitted such that processing is executed from step S102. Moreover, each door mirror 12 stops moving when so-called clutch disengagement occurs as a result of the door mirror 12 striking a nearby obstacle during retraction or deployment or due to the respective motor 22 adopting the locked state. In such cases, the respective door mirror control ECU 26, for example, considers an operational error to have occurred and stops output of the drive voltage $V_D$.

Note that during retraction or deployment of the door mirrors 12, the door mirror control device 20 measures the operating times $T_{MR}$, $T_{ML}$, which are the intervals of time that each of the door mirrors 12 is in operation, and the door mirror control device 20 changes the drive voltage $V_{DR}$, $V_{DL}$ settings based on the measured operating times $T_{MR}$, $T_{ML}$.

FIG. 7 and FIG. 8 illustrate an example of setting changing processing for each drive voltage $V_{DR}$, $V_{DL}$. These flowcharts are executed at preset timings. The setting changing processing may, for example, be executed for each retraction or deployment operation of the door mirrors 12, or each time a preset number of retraction/deployment operations of the door mirrors 12 has been reached (retractions and deployments may be counted individually, or retractions and deployments may be counted together as a set). The setting changing processing may also be executed employing a freely selected timing, such as at the time of initial retraction or deployment after the ignition switch is operated to ACC ON, at the time of a first retraction or deployment after a preset time interval (this time interval may be hours or a number of days) has elapsed, or when the door mirrors 12 are replaced or serviced.

In the setting processing for the drive voltage $V_D$, the operating time evaluation and voltage setting processing illustrated in FIG. 8 is executed after the operating time measurement and determination processing illustrated in FIG. 7 have been executed. Note that the processing of FIG. 7 is executed by each of the door mirror control ECUs 26R, 26L, information is transmitted between the door mirror control ECUs 26R, 26L in the processing of FIG. 8, and the processing of FIG. 8 is executed using the operating times $T_M$ that the door mirror control ECUs 26R, 26L each acquire from the other.

In the operating time measurement and determination processing illustrated in FIG. 7, at an initial step S110, determination is made as to whether or not output of the drive voltage $V_D$ for retraction or deployment of the door mirror 12 has started, and when output of the drive voltage $V_D$ has started, affirmative determination is made at step S110 and processing transitions to step S112. At step S112, a timewise change in the operating current $I_D$ is detected, and at step S114, determination is made as to whether or not, for example, the operating current $I_D$ has reached zero ($I_D$=0) from the timewise change in the operating current $I_D$.

When the door mirror 12 reaches the retracted position or the deployed position and the lock detection circuit 24 stops voltage supply to the motor 22, the operating current $I_D$=0. Affirmative determination is therefore made at step S114 and processing transitions to step S116. Note that at step S114, instead of using operating current $I_D$, determination may be made as to whether or not output of the drive voltage $V_D$ to the door mirror 12 has stopped. In such cases, affirmative determination is made at step S114 and processing transitions to step S116 when output of the drive voltage $V_D$ stops.

At step S116, the interval of time from when driving of the motor 22 of the door mirror 12 starts up until the motor 22 reaches the locked state is measured as the operating time $T_M$ based on the timewise change in the operating current $I_D$ from when supply of the drive voltage $V_D$ starts until supply of the drive voltage $V_D$ stops.

When the operating time $T_M$ is measured in this manner, at the following step S118, determination is made as to whether or not the operating time $T_M$ is within a permissible range of times in which changes to a drive voltage $V_D$ setting may be applied. Namely, determination is made as to whether or not the measured operating time $T_M$ is between (within the permissible range) a lower limit time $T_{MLOW}$ and an upper limit time $T_{MHIGH}$ determined using the reference operating time $T_{MC}$. When the measured operating time $T_M$ is in a range of from the lower limit time $T_{MLOW}$ to the upper limit time $T_{MHIGH}$ ($T_{MLOW} \leq T_M \leq T_{MHIGH}$), determination is made at step S118 that the operating time $T_M$ can be applied to change a drive voltage $V_D$ setting. Accordingly, at step S120, the measured operating time $T_M$ is applied to change a drive voltage $V_D$ setting. Note that in cases in which the operating time $T_M$ is either shorter than the lower limit time $T_{MLOW}$ ($T_M < T_{MLOW}$) or the operating time $T_M$ is longer than the upper limit time $T_{MHIGH}$ ($T_{MHIGH} < T_M$), negative determination is made at step S118 and processing ends.

In this manner, the door mirror control device 20 sets a reference operating time $T_{MC}$ and a permissible range (the range of from the lower limit time $T_{MLOW}$ to the upper limit time $T_{MHIGH}$) based on the reference operating time $T_{MC}$ for the operating times $T_M$ measured from the changes in the operating currents $I_D$. This enables the door mirror control device 20 to prevent an offset from arising in the timings at which the retracted position or the deployed position are reached due to the drive voltages $V_D$ being improperly set as a result of, for example, a door mirror 12 being in a state folded toward the front of the vehicle or a door mirror 12 being in a state folded toward the rear of the vehicle when a retraction operation is performed.

The processing of FIG. 8 is executed after the processing of FIG. 7 ends. In, the operating time evaluation and voltage setting processing illustrated in FIG. 8, at an initial step S130, determination is made as to whether or not the operating times $T_M$ ($T_{MR}$, $T_{ML}$) can be applied to change a drive voltage $V_D$ setting for each of the right door mirror 12R and the left door mirror 12L. Namely, determination is made as to whether or not affirmative determination was made at step S118 illustrated in FIG. 7 for each of the door mirror control ECU 26R and the door mirror control ECU 26L.

In cases in which both of the operating times $T_{MR}$, $T_{ML}$ can be applied to set a drive voltage $V_D$, affirmative determination is made at step S130 and processing transitions to step S132. Note that in cases in which at least one of the operating times $T_{MR}$, $T_{ML}$ is not applicable to change a drive voltage $V_D$ setting (in cases in which a negative determination was made at step S118 illustrated in FIG. 7 for at least one of the door mirror control ECU 26R or the door mirror control ECU 26L), negative determination is made at step S130 and processing ends without changing a drive voltage $V_D$ setting.

At step S132, a time difference $\Delta T$ between the operating times $T_{MR}$, $T_{ML}$ is computed, and at step S134, determination is made as to whether or not the computed time difference $\Delta T$ is at or below the preset threshold value $\Delta Ts$. Namely, steps S132, S134 evaluate whether or not the timings for retraction or deployment of the right door mirror 12R and the left door mirror 12 can be considered to be matching. When the time difference $\Delta T$ is at or below the predetermined threshold value $\Delta Ts$ ($-\Delta Ts \leq \Delta T \leq \Delta Ts$), the timings at which the retracted positions or the deployed positions are considered to be matching, and change to a drive voltage $V_D$ setting is evaluated to be unnecessary. Negative determination is therefore made at step S134, and processing ends without changing a drive voltage $V_D$ setting.

In contrast thereto, when the time difference $\Delta T$ exceeds the threshold value $\Delta Ts$ ($\Delta T < -\Delta Ts$, or $\Delta Ts < \Delta T$), the evaluation is that there is an offset in the timings at which the retracted positions or the deployed positions are reached. Thus, negative determination is made at step S134 and processing transitions to step S136. At step S136, drive voltages $V_D$ are set such that the operating time $T_{MR}$ of the right door mirror 12R and the operating time $T_{ML}$ of the left door mirror 12L match each other. Then, at step S138, the drive voltages $V_D$ output from the voltage control sections 42 are changed to the set drive voltages $V_D$.

In contrast thereto, when the time difference $\Delta T$ exceeds the threshold value $\Delta T_S$ ($\Delta T < -\Delta T_S$, or $\Delta T_S < \Delta T$), the evaluation is that there is an offset in the timings at which the retracted positions or the deployed positions are reached. Thus, negative determination is made at step S132 and processing transitions to step S134. At step S134, drive voltages $V_D$ are set such that the operating time $T_{MR}$ of the right door mirror 12R and the operating time $T_{ML}$ of the left door mirror 12L match each other. Then, at step S136, the drive voltages $V_D$ output from the voltage control sections 42 are changed to the set drive voltages $V_D$.

In the present exemplary embodiment, a setting change is performed on the drive voltage $V_{DL}$ of the left door mirror 12L, for example, with reference to the right door mirror 12R that moves a greater amount and that has a longer operating time $T_M$ during retraction or deployment.

Setting of the drive voltage $V_{DL}$ is performed based on the operating time $T_{MR}$ of the right door mirror 12R, the operating time $T_{ML}$ of the left door mirror 12L, and the drive voltage $V_{DL}$ supplied to the left door mirror 12L (referred to here as drive voltage $V_{DL0}$). The drive voltage $V_{DL}$ is computed from the operating times $T_{MR}$, $T_{ML}$ and the drive voltage $V_{DL0}$ as, for example, $V_{DL} = V_{DL0} \times (T_{MR}/T_{ML})$.

In this manner, the computed drive voltage $V_D$ ($V_{DL}$) is set to be the new drive voltage $V_D$ for subsequent retractions or deployments of the door mirrors 12. FIG. 9(B) and FIG. 9(D) illustrate examples of change in the drive voltages $V_D$ output from the voltage control sections 42, and FIG. 9(A) and FIG. 9(C) illustrate examples of change in the operating currents $I_D$ in the door mirrors 12 detected by the current detection sections 44. Note that FIG. 9(A) and FIG. 9(B) correspond to the left door mirror 12L (door mirror control ECU 26L) and FIG. 9(C) and FIG. 9(D) correspond to the right door mirror 12R (door mirror control ECU 26R).

In cases in which the operating time $T_{ML}$ is shorter than the operating time $T_{MR}$ ($T_{ML} < T_{MR}$), as illustrated in FIG. 9(B), the drive voltage $V_{DL}$ output from the voltage control section 42 of the door mirror control ECU 26L is set so as to be lower than the drive voltage $V_{DL0}$ ($V_{DL} < V_{DL0}$). Thus, when the door mirrors 12 are retracted or deployed, as illustrated in FIG. 9(A) and FIG. 9(C), the operating time $T_{ML}$ of the left door mirror 12L matches a operating time $T_{MR}$ of the right door mirror 12R. Note that in cases in which the operating time $T_{ML}$ of the left door mirror 12L is longer than the operating time $T_{MR}$ of the right door mirror 12R ($T_{ML} > T_{MR}$), the drive voltage $V_{DL}$ is set so as to be higher than the drive voltage $V_{DL0}$ ($V_{DL} > V_{DL0}$).

Accordingly, in the vehicle 10 provided with the door mirror control device 20, when the door mirrors 12 are retracted or deployed, the timings at which the right door mirror 12R and the left door mirror 12L reach the retracted position or the deployed position match each other, enabling operation of the door mirrors 12 during retraction or deployment to impart a sense of luxury to the vehicle 10.

In the door mirror control device 20, when the operating time $T_{MR}$ of the reference door mirror 12R is a specific percentage of the predetermined standard operating time $T_{MS}$ or greater, at step S134 illustrated in FIG. 8, the drive voltage $V_{DR}$ is set such that the operating time $T_{MR}$ of the right door mirror 12R returns to the standard operating time $T_{MS}$. Moreover, the door mirror control device 20 sets the drive voltage $V_{DL}$ of the left door mirror 12L so as to match the set drive voltage $V_{AR}$.

When this occurs, the drive voltage $V_{DR}$ of the right door mirror 12R is computed and set based on the standard operating time $T_{MS}$, the operating time $T_{MR}$, and the drive voltage $V_{DR0}$ output from the voltage control section 42 of the door mirror control ECU 26R. For example, the drive voltage $V_{DR}$ is computed as $V_{DR}=V_{DR0}\times(T_{MR}/T_{MS})$.

In addition, the drive voltage $V_{DL}$ of the left door mirror 12L is computed and set based on the standard operating time $T_{MS}$, the operating times $T_{MR}$, $T_{ML}$, and the drive voltage $V_{DL0}$. For example, the drive voltage $V_{DL}$ is computed as $V_{DL}=V_{DL0}\times(T_{MR}/T_{ML})\times(T_{MR}/T_{MS})$.

Thus, in the door mirror control device 20, when the operating time $T_{MR}$ of the reference right door mirror 12R is equal to or greater than a preset interval of time, for example, when the operating time $T_{MR}$ is an interval of time that is at least a percentage set with reference to the standard operating time $T_{MS}$, the drive voltages $V_D$ ($V_{DR}$, $V_{DL}$) are reset such that the operating time $T_M$ ($T_{MR}$) returns to the standard operating time $T_{MS}$. This enables the door mirror control device 20 to prevent the retraction time or the deployment time of the door mirrors 12 from becoming longer, such that the timings at which the right door mirror 12R and the left door mirror 12L reach the retracted position or the deployed position match each other. Note that although the right door mirror 12R is, for example, used as the reference to set the standard operating time $T_{MS}$ in the present exemplary embodiment, the left door mirror 12L may be used as the reference, or the operating times of the door mirrors 12 may be set to standard times.

Note that in the present exemplary embodiment explained above, although the right door mirror 12R that moves a greater amount during retraction or deployment is referenced to set the drive voltages $V_D$ such that the operating time $T_{ML}$ of the left door mirror 12L matches the operating time $T_{MR}$ of the right door mirror 12R, there is no limitation thereto.

For example, configuration may be made such that the shorter out of the operating time $T_{MR}$ of the right door mirror 12R and the operating time $T_{ML}$ of the left door mirror 12L is made to match the longer one thereof. For example, in cases in which the operating time $T_{MR}$ is shorter than the operating time $T_{ML}$, the drive voltage $V_{DR}$ of the right door mirror 12R may be computed and set as, for example, $V_{DR}=V_{DR0}\times(T_{ML}/T_{MR})$.

Further, in the present exemplary embodiment, although explanation was given with reference to the door mirror control ECU 26R and the door mirror control ECU 26L, there is no limitation thereto, and configuration may be made such that operation of the right door mirror 12R and the left door mirror 12L is controlled by a single door mirror control ECU 26.

In this manner, the door mirror control device 20 detects change in the operating currents $I_D$, and from the detected changes in the operating currents $I_D$, determines the operating times $T_M$ of the door mirrors 12, thereby enabling an appropriate operating times $T_M$ to be obtained for the door mirrors 12. Further, the door mirror control device 20 sets the drive voltages $V_D$ such that the operating times $T_M$ ($T_{MR}$, $T_{ML}$) of left and right door mirrors 12 are matched, thereby enabling the timings at which the door mirrors 12 reach the retracted position or the deployed position to be appropriately matched.

Further, in cases in which the operating times $T_M$ are outside a permissible range based on the reference operating time $T_{MC}$, the door mirror control device 20 does not set (update) the drive voltages $V_D$, thereby enabling the occurrence of offsets in the timings at which the door mirrors 12 reach the retracted position or the deployed position to be suppressed. In addition, in cases in which the operating times $T_M$ are outside a permissible range set based on the standard operating time $T_{MS}$, the door mirror control device 20 sets the drive voltages $V_D$ such that the operating times $T_M$ return to the standard operating time $T_{MS}$, thereby enabling retraction/deployment operations of the door mirrors 12 to be prevented from becoming too quick or too slow.

Note that the door mirror control device 20 to which the present disclosure is applied may be applied to control a door mirror of any freely selected configuration having a lock detection means that detects when a retracted position or a deployed position has been reached and a motor has adopted a locked state, and that stops power to the motor 22.

The disclosure of Japanese Patent Application No. 2015-112286 is incorporated in its entirety by reference herein.

All publications, patent applications, and technical standards mentioned in the present specification are incorporated by reference in the present specification to the same extent as if each individual publication, patent application, or technical standard was specifically and individually indicated to be incorporated by reference.

The invention claimed is:

1. A door mirror control device comprising:
voltage supply sections provided so as to each correspond to one of a pair of door mirrors that are provided at the left and right of a vehicle and that each include (i) a motor that is driven by the supply of a voltage and that operates the respective door mirror from one of a retracted position or a deployed position to the other of the retracted position or the deployed position at a speed corresponding to the magnitude of the voltage, and (ii) a lock detection section that supplies to the motor, as the voltage, a voltage of a magnitude corresponding to a drive voltage supplied to the lock detection section and that stops supplying the voltage to the motor in a case in which the respective door mirror has reached the retracted position or the deployed position and the motor has adopted a locked state, each voltage supply section supplying the drive voltage to the respective lock detection section with a magnitude set for the respective door mirror;
detection sections that are provided so as to each correspond to one of the pair of door mirrors, and that, from change in a current flowing through the respective lock detection section, detect a time interval from starting the supply of the drive voltage until the respective motor reaches the locked state as an operating time to operate the respective door mirror from one of the retracted position or the deployed position to the other of the retracted position or the deployed position; and
a changing section that, based on the respective time intervals detected by the detection sections, changes a magnitude setting of the drive voltage supplied by the voltage supply section to the lock detection section of at least one of the pair of door mirrors such that operating times for the pair of door mirrors to operate from one of the retracted position or the deployed position to the other of the retracted position or the deployed position match each other.

2. The door mirror control device of claim 1, wherein: the changing section changes the magnitude setting of the drive voltage based on the operating times respectively detected for the pair of door mirrors in cases in which a difference in the detected operating times has exceeded a predetermined threshold value.

3. The door mirror control device of claim 1, wherein: with reference to whichever door mirror of the pair of door mirrors has a greater amount of movement from one of the retracted position or the deployed position to the other of the retracted position or the deployed position, the changing section changes the magnitude setting of the drive voltage such that a detected operating time of the other door mirror having the lesser amount of movement matches a detected operating time of the reference door mirror.

4. The door mirror control device of claim 1, wherein: with reference to the longer operating time of the operating times respectively detected for the pair of door mirrors, the changing section changes the magnitude setting of the drive voltage supplied to the lock detection section of the other door mirror corresponding to the shorter operating time.

5. The door mirror control device of claim 1, wherein: a permissible range is set in advance for the operating times of the pair of door mirrors to operate from one of the retracted position or the deployed position to the other of the retracted position or the deployed position; and in cases in which the operating times respectively detected for the pair of door mirrors are within the permissible range, the detection sections determine that the detected operating times are to be applied to change the magnitude setting of the respective drive voltage.

6. The door mirror control device of claim 1, wherein: a standard operating time and a permissible range based on the standard operating time are set for one of the pair of door mirrors; and in cases in which the detected operating time of the door mirror for which the standard operating time has been set is outside the permissible range set based on the standard operating time, the changing section changes the magnitude setting of the drive voltage such that the operating time for this door mirror to operate from one of the retracted position or the deployed position to the other of the retracted position or the deployed position is set to the standard operating time.

* * * * *